United States Patent [19]

Futamura et al.

[11] 4,435,482
[45] Mar. 6, 1984

[54] SLIDING MEMBER AND PROCESS FOR PRODUCING THE SAME

[75] Inventors: Kenichiro Futamura, Toyota; Eiji Asada, Okazaki; Tatsuhiko Fukuoka, Aichi, all of Japan

[73] Assignee: Taiho Kogyo Co., Ltd., Aichi, Japan

[21] Appl. No.: 238,105

[22] Filed: Feb. 25, 1981

[51] Int. Cl.³ .......................... B22F 7/04; B32B 15/16
[52] U.S. Cl. .................................... 428/553; 75/230; 75/231; 75/244
[58] Field of Search ................. 75/208, 230, 231, 244; 428/553; 427/191, 376.8

[56] References Cited

U.S. PATENT DOCUMENTS

| | | | |
|---|---|---|---|
| 1,197,695 | 8/1916 | Watkins | 427/376.8 |
| 3,977,838 | 8/1976 | Hashimoto et al. | 75/244 X |
| 3,991,240 | 11/1976 | Harrington et al. | 427/191 X |
| 4,243,414 | 1/1981 | Takahashi et al. | 75/244 |

FOREIGN PATENT DOCUMENTS

| | | | |
|---|---|---|---|
| 1602258 | 11/1970 | France | 428/553 |
| 55-113805 | 9/1980 | Japan | 428/553 |
| 55-154544 | 12/1980 | Japan | 75/244 |

*Primary Examiner*—Mark Bell
*Attorney, Agent, or Firm*—Burgess, Ryan & Wayne

[57] ABSTRACT

The present invention aims to provide a sliding member: to be operated under a high load and high sliding speed; having high impact resistance and high break-in property; to be highly resistant and stable under boundary lubricating conditions, and; to be engaged with the swash plate made of iron or aluminum in a swash plate type compressor. The sliding member of the present invention comprises:

a base comprising an iron-based alloy, and;
a bearing layer, consolidated to said base and formed by applying on said base a powder coating having a thickness not more than 0.5 mm, and then baking said coating, said powder consisting of an iron family element and an additive component which includes from 3 to 30% by weight of boron.

15 Claims, 5 Drawing Figures

Fig. 5 ing oil used in engine compartments is thus disadvantageously influenced to an appreciable extent by such elevated temperatures.

Not only the influence of the sliding effect on the life of shoes, but also the influence of the impact load applied to the shoes due to the reciprocating movement of pistons should be taken into account when the internal combustion engine is operated at a high rotation number.

The swash plate has heretofore been made of iron-based materials, as stated above, which are mainly iron-based forged materials. The present assignee, however, designs to replace the iron-based forged materials for the shoes with aluminum-based materials, such as Alusil alloy, so as to meet the recent severe requirement of the reduction of the total weight of the automobile. With regard to the material of a sliding member which constitutes the slidable engagement with the aluminum based sliding member in the swash-plate type compressor, cast iron, which has been used for piston rings constituting the slidable engagement with the aluminum based cylinders of an internal combustion engine, is unsatisfactory, because the sliding phenomena of the swash plate-type compressor and the internal combustion engine are different from one another. The present inventors have discovered by experiments that copper alloys are ineffective for the material of the shoes used in combination with the aluminum alloy swash plate.

It is an object of the present invention to provide a sliding member suitable to be operated under a high load and at a high speed.

It is another object of the present invention to provide a sliding member having high wear-resistance, high impact resistance and a fast break-in property under the high load- and high speed-operation condition of the sliding member.

It is a further object of the present invention to provide a slidable member suitable to be operated under a condition where supplying a lubricating oil to a slidable engagement is difficult and hence the thickness of lubricating oil is liable to be insufficient for preventing a solid contact from occurring between the engaged sliding members.

It is yet a further object of the present invention to provide a sliding member suitable to be operated under a high load- and high speed-condition and exhibiting the properties equivalent or superior to those of hardened, carburized or surface-treated iron-based materials.

It is yet another object of the present invention to provide a sliding member used in a sliding engagement with a material of the iron family which includes iron, an iron alloy, such as special cast iron, nickel, cobalt and alloys of nickel or cobalt.

It is also an object of the present invention to provide a sliding member suitable for use as shoes of a swash plate type compressor without an oil pump, wherein the swash plate is made of a wear-resistant aluminum alloy, such as a high Si aluminum alloy, for example Alusil alloy.

It is still another object of the present invention to provide a process for producing a sliding member.

In accordance with the objects of the present invention, there is provided a composite sliding member comprising:

a base comprising an iron-based alloy, and;

a bearing layer consolidated to said base and formed by applying on said base a powder coating having a thickness not more than 0.5 mm and then baking said coating, said powder consisting of an iron family element and an additive component which includes from 3 to 30% by weight of boron.

One of the features of the sliding member of the present invention is a higher boron content than the conventional iron based material. Boron forms hard borides with iron, cobalt and nickel of the iron family element and enhances the wear resistance of the composite sliding member. The borides are supposedly FeB, $Fe_2B$ or the like. If the boron content is less than 3%, the hardness of the bearing layer is very low. On the other hand, if the boron content is more than 30%, not only the bearing layer becomes brittle but also the dispersion state of the borides becomes inferior. Boron content is preferably from 15 to 25%.

Another feature of the sliding member of the present invention is a composite structure of the base or backing metal and the boron-containing alloy of the iron family element. In other words the sliding member of the present invention does not have a solid structure but a composite structure, in which the bearing layer including hard borides in dispersed state are combined or consolidated with the base which has high mechanical strength. The composite structure contributes to enhancement of the sliding characteristic under a high speed- and unstationary-sliding condition. The present invention, therefore, makes it possible to prevent such seizure which is liable to occur, due to a heat generation on the bearing surface layer of a sliding member, when the conventional sliding member is subjected to sliding at a speed a mounting about ten meters per second.

Another feature of the sliding member of the present invention resides in the fact that the bearing layer is formed by applying on the base a powder coating having a thickness not more than 0.5 mm and then baking the powder coating so as to consolidate the powder coating with the base. In the baking mentioned above, a reaction of consolidating the coating powder with the base, a reaction between the chemical components contained in the powder particles, and a reaction between the powder particles progress simultaneously. Due to these reactions, the borides are formed and dispersed in the alloy matrix of an iron family element. It was discovered by the present inventors that, although the consolidation reaction between the powder coating and the base takes place, no appreciable diffusion layer of iron is present at the interface between the bearing layer and the base. In this regard, the diffusion layer of iron is formed between the surface layer and the base when the surface treatments of iron are conducted by the Tufftride process and the diffusion-impregnation process. However, in the present invention, the bearing layer is consolidated with the base not via the iron diffusion layer but directly. More specifically, the distribution of iron nitrides is uniform in the bearing layer. Nickel of the iron family element is however, diffused into the base to a slight extent.

The thickness of the powder coating up to 0.5 mm, preferably from 0.1 to 0.5 mm, allows: a homogeneous micro-structure of the bearing layer to be formed after baking; a high hardness and high wear resistance of the bearing layer to be displayed after baking, and; high mechanical properties of the base to be fully utilized for enhancing the sliding characteristic of the sliding member. When the thickness of the powder coating is about 0.3 mm, the thickness of the bearing layer is about 0.5 mm. Therefore, the thickness of the powder coating is

SLIDING MEMBER AND PROCESS FOR PRODUCING THE SAME

The present invention relates to a sliding member and the process for producing the same. More particularly, the present invention relates to a sliding member adapted to be used under severe condition, particularly a high speed-high load-condition or a boundary lubricating condition.

The sliding members used under the high speed-high load condition include those used in various parts of an internal combustion engine, such as a rocker arm and its rocking cam which are required to be wear resistant. The apex seal of a rotary internal combustion engine is one of the sliding members to be subjected to very severe wear. For such sliding members, iron-based materials, which are hardened, carburized or surface treated by various hard metals, have been used, and these materials display certain effects.

The sliding members described above are frequently operated in such a manner that a linear or almost linear contact, as well as a point or almost point contact occurs between the engaged sliding members. Such an operation condition may cause a problem in lubrication, that is, supplying a lubricating oil to the sliding members becomes difficult or the thickness of the lubricating oil film is insufficient to prevent a solid contact from occurring between the coupled engaged sliding members. This lubrication is known as boundary lubrication. In addition, when the sliding speed exceeds a few meters per second, the engaged sliding members, which are in contact with each other without an intermediate lubricating oil, are subjected to excess heat generated by the sliding members, so that adhesion or seizure between the sliding members may occur. This adhesion or seizure phenomenon is liable to occur when the sliding members are composed of the same type of metal. Even if the adhesion or seizure because of high speed sliding does not occur, the metals of the sliding members are exposed to a high temperature and liable to soften.

The sliding members operated under the boundary lubrication include a shoe of a swash plate type compressor used in the air conditioning apparatus of vehicles.

U.S. Pat. No. 3,955,899 issued to Nakayama et al discloses a swash-plate type compressor, in which the swash plate is secured to and rotated with a drive shaft, the rotating movement of which shaft is converted to a reciprocal movement via shoes slidably engaged with the swash plate and via ball bearings for slidably pressing the shoes against the swash plate. The swash-plate type compressor disclosed in the patent mentioned above eliminates the necessity of an oil pump for lubricating the movable parts of the compressor, because, according to the recent tendency to decrease the weight of the vehicle, all compressors utilized for air-conditioning vehicles are required to have a compact structure and a light weight. A small amount of lubricating oil supplied to the slidable arrangements, for example, between the shoes and the ball bearings of the swash-plate type compressor disclosed in the U.S. patent mentioned above, is supplied in a gaseous state after being mixed with a refrigerant gas. The lubricating system employed in the swash-plate type compressor, without the presence of an oil pump, gasifies the lubricating oil and effectively circulates the oil through the slidable arrangements of the compressor.

Iron-based materials have heretofore been used for forming a swash plate so as to provide the swash plate with resistance against a high surface pressure and against an impact load, as well as against severe lubricating condition. In such cases, the surface of the swash plate was quenched so as to enhance the wear resistance and the fatigue strength thereof.

When the swash-plate type compressor is employed in the air-conditioning apparatus for vehicles, the operational conditions of the compressor become considerably more severe, because the drive source of the compressor is an internal combustion engine, i.e., a gasoline engine or a Diesel engine, and furthermore because the compressor, which is compact in structure and light in weight, is rotated at almost the same rotational speed as that of the internal combustion engine. Accordingly, the swash-plate type compressor is subjected to a rotational rate of 500 rpm when the internal combustion engine is idling, and to a rotational rate of 6000 rpm during sudden acceleration or during high speed travel.

In addition, frictional wear of the sliding elements of the compressor is liable to be promoted because the oil pump mentioned above is eliminated from the compressor and also because the amount of the lubricating oil used therein is decreased for increasing the efficiency of the compressor mentioned above. In more detail, the life of the slidable engagement between the swash plate and the shoes is most critically influenced by the lubricating condition therebetween, particularly by the amount of lubricating oil. In addition, since the sliding movement of the swash plate with respect to the shoes is performed under thrust sliding, the sliding surfaces are constantly maintained under a boundary lubrication and are thus brought into contact with one another in a solid contact, i.e., without using lubricating oil as an intermediary. It is, therefore, difficult to obtain a sufficient lubricating effect for the slidable arrangement between the swash plate and the shoes, even when the amount of lubricating oil supplied to the compressor is increased. In addition to the thrust sliding action, the lubricating oil cannot be supplied to the sliding surfaces of the swash plate and the shoes, because the unsteady rotating movement of the swash-plate compressor is not able to be prevented as long as the compressor is employed for air-conditioning vehicles. Namely, during a period of several tens of seconds or even a period of a few minutes, after the starting of the compressor, the swash plate slides with respect to the shoes, but it is not lubricated at all by oil; consequently, a solid contact between the shoes and the swash plate is disadvantageously carried out during the initial period of the compressor operation. Accordingly, a detrimental sliding condition caused by the absence of a lubricating oil, will in turn cause the occurrence of seizure of the swash plate by the shoes, which seizure is most frequently encountered in the accidents of the swash-plate type compressor. Even if such seizure is not brought about directly by the sliding condition wherein lubricating oil is not supplied, abrasion caused under the above-mentioned detrimental condition may become a serious defect which afterwards leads to the occurrence of seizure of the swash-plate by the shoes. In addition, due to recent temperature increases in engine compartments caused by the addition thereto of various parts of vehicles, such as devices for purification of exhaust gas for decreasing fuel consumption and the like, lubricatremain in the bearing layer if the binder content is 3% or less. The alloy powder preferably has a particle size of −200 mesh, i.e. finer than 200 mesh. The mixture paste of the alloy powder and binder is applied on the base by a brush, a knife or moulding. The mixture paste applied on the base is baked at a temperature of ranging from 1000° to 1100° C. in a hydrogen atmosphere. The baking temperature should be changed within this range in such a manner that the temperature in the former baking stage is higher than the temperature in the latter baking stage. The former baking and latter baking may be carried out at 1100° C. for 5 minutes and 1000° C. for 10 minutes, respectively. The former baking mainly achieves the consolidation of the bearing layer and the base and the latter baking mainly homogenizes the bearing layer. As explained above, a reaction of forming the compounds, e.g. iron boride, and alloy matrix, e.g. Fe-Mo matrix, takes place during baking. The baking temperature and time should be selected, so as to form the compounds and matrix having requisite hardness. The hardness of iron boride and Fe-Mo matrix is Hv 600–800 and Hv (Vickers hardness) 1000–1400, respectively.

The base (backing metal) should have excellent strength against stress, such as the compression and shear stresses, and is preferably a steel plate. The thickness of the steel plate is preferably 2 mm or more.

The present invention is explained in detail by way of Examples and with reference to the drawings, wherein.

EXAMPLE 1

The composite sliding members having the bearing layers of the composition given in Table 1 (Nos. 1 through 13) were produced. Starting materials were alloy powder of the iron family element, ferroboron powder, lead powder and ferrophosphorus powder, all powders having a particle size of −250 mesh. These powders, whose composition was known beforehand, were mixed to provide the powder mixtures of the composition given in Table 1. The powder mixtures were mixed with starch paste and the so formed paste mixtures were applied on the base made of steel to a thickness in the range of from 0.2 to 0.3 mm. The base had a shape of the shoe of a swash plate type compressor. The bases, on which the paste mixture was applied, were heated at 1100° C. for 5 minutes and then 1000° C. for 10 minutes in a hydrogen atmosphere. The thickness of the obtained bearing layer was about 0.4 mm.

Sample Nos. 14 through 19 are solid sliding members produced by comparison purposes.

TABLE 1

| Sample Nos. | Iron Family Metal (wt %) | | | Additive Element (wt %) | | | Hardness (Hv) |
| --- | --- | --- | --- | --- | --- | --- | --- |
| | Fe | Ni | Co | B | Pb | P | |
| 1 | bal | — | — | 3 | — | — | 650–800 |
| 2 | " | 20 | — | 15 | — | — | 700–900 |
| 3 | " | 20 | — | 20 | — | — | 750–1000 |
| 4 | " | 10 | 10 | 30 | — | — | 750–1200 |
| 5 | " | 20 | — | 20 | 1 | — | 750–1000 |
| 6 | " | 20 | — | 20 | 5 | — | 750–1000 |

TABLE 1-continued

| Sample Nos. | Iron Family Metal (wt %) | | | Additive Element (wt %) | | | Hardness (Hv) |
| --- | --- | --- | --- | --- | --- | --- | --- |
| | Fe | Ni | Co | B | Pb | P | |
| 7 | " | 20 | — | 20 | 12 | — | 750–1000 |
| 8 | " | 20 | — | 20 | 5 | 1 | 750–1200 |
| 9 | " | 20 | — | 20 | 5 | 4 | 800–1400 |
| 10 | " | 20 | — | 20 | 5 | 8 | 800–1400 |
| 11 | " | 30 | — | 25 | 3 | 5 | 800–1100 |
| 12 | " | 15 | 20 | 15 | 4 | 5 | 800–1100 |
| 13 | " | 10 | — | 20 | 7 | 3 | 800–1200 |
| 14 | S45C (Quenched) | | | | | | 400 |
| 15 | S45C (Soft Nitriding Treatment) | | | | | | 450 |
| 16 | SKS5 (Quenched and Tempered) | | | | | | 550 |
| 17 | S45C (Chrome Plated) | | | | | | 800 |
| 18 | Phosphor Bronze (Cu-8% Sn-0.4% P) | | | | | | 120 |
| 19 | High Strength Bronze (Cu-35% Zn-2% Al-1% Si-2.5% Mn-2% Pb) | | | | | | 160 |

S45C-carbon steel (JIS)
SKS5-alloyed tool steel (JIS)

Although not specified in Table 1, the bearing layer of the sliding member according to the present invention contained a small amount of impurities, i.e. chromium, carbon and silicon.

The samples given in Table 1 were subjected to a sliding test under the following conditions.

(1) Sliding speed: constant speed of 15 m/sec.

(2) Load: load was increased from 20 kg/cm$^2$ by 20 kg/cm$^2$ at every loading stage and each loading stage lasted 30 minutes.

(3) Lubricating oil: mixture of one volume part of an ice machine oil and nine volume part of light oil was applied at rate of about 0.8 cc/min. by felt.

(4) Surface condition of the samples: straightness was 1 micron or less and roughness was from 0.4 to 0.6S.

(5) Mating mamber: disc made of gray cast iron (FC 20), the straightness of 1 micron or less and roughness of from 0.4 to 0.6S.

(6) Environmental temperature: 145±5° C.

The load at which the seizure occured.

TABLE 2

| Sample Nos. | Seizure Load (kg/cm$^2$) |
| --- | --- |
| 1 (Invention) | 100 |
| 2 (Invention) | 160 |
| 3 (Invention) | 180 |
| 4 (Invention) | 180 |
| 5 (Invention) | 180 |
| 6 (Invention) | 180 |
| 7 (Invention) | 200 |
| 8 (Invention) | 180 |
| 9 (Invention) | 180 |
| 10 (Invention) | 200 |
| 11 (Invention) | 180 |
| 12 (Invention) | 180 |
| 13 (Invention) | 180 |
| 14 (Control) | 60 |
| 15 (Control) | 80 |
| 16 (Control) | 60 |
| 17 (Control) | 80 |
| 18 (Control) | 40 |
| 19 (Control) | 40 |

Samples 14 and 16 correspond to the materials previously used for the shoes of a swash plate type compressor because of high hardness. However, the seizure load of Samples 14 and 16 is considerably lower than 100 kg/cm$^2$. The seizure load of Samples 15 and 17 having a hard surface layer is also low. Because of the low seizure load of these Samples, it is not possible to preincreased during the baking possibly due to the mutual exchange of iron in the base and the powder coating.

In an embodiment of the present invention the additive component further includes up to 15% of lead. Lead has a low melting point and is not dissolved into solid solution of the iron family element. The lead is therefore dispersed in the matrix of the iron family element and enhances the break-in property and slidability of the sliding member under both high speed- and low speed-sliding conditions. More specifically, various sliding problems occurring during sliding without benefit of lubricating oil can be effectively eliminated by the enhanced break-in property and slidability. Generally speaking, an adhesion or seizure is liable to occur when both sliding member and mating member are iron based. Such adhesion or seizure can be effectively prevented by lead. When the lead content exceeds 15%, it is difficult to uniformly disperse lead in the matrix, with the result that the strength of the matrix is undesirably reduced. An effective content of lead is at least 0.5% and a preferable lead content is from 3 to 10%. However, the optimum lead content is 5%.

In another embodiment of the present invention, the additive component further includes up to 8% of phosphorus. Phosphorus forms a hard compound with iron of the iron family element, and is dispersed in the matrix and strengthens the matrix. The hard compound is supposedly $Fe_2P$, $Fe_3P$ or the like. In the bearing layer containing phosphorus, a hardness drop at high temperature is suppressed due to strengthening of the matrix, and lubricating oil is liable to be captured by the surface of the bearing layer due to finely dispersed phosphides in the matrix. Therefore, the phosphorus additive displays remarkable effects, when the composite sliding member is used under high speed sliding condition or sliding condition with a small amount of lubricating oil. Phosphorus is also effective for reducing the scatter of seizure load and thus enhancing the reliability of the composite sliding members. When the phosphorus content exceeds 8%, the composite sliding members, such as shoes of the swash plate type compressor, are embrittled. An effective content of phosphorus is at least 0.5%, and a preferable phosphorus content is from 3 to 8%. The optimum phosphorus content is 5% at the maximum.

In an embodiment of the present invention, both phosphorus in an amount up to 8% and lead in an amount up to 15% are contained in the bearing layer. Lead and phosphorus have an affinity with one another and enhance the slidability and seizure resistance better than by a single addition.

In another embodiment of the present invention, the bearing layer contains, in addition to an optional element of phosphorus and/or lead, molybdenum in an amount of from 0.1 to 10%. Most of molybdenum constitutes the matrix together with the iron family element and strengthens the matrix consisting of the iron family element. Molybdenum is effective for preventing crack of the sliding members such as shoes operated under application of impact force rather than for enhancing the wear resistance. Molybdenum in an amount less than 0.1% is not enough for strengthening the matrix consisting of the iron family element. When the molybdenum content exceeds 10%, the bearing layer becomes so hard that it is embrittled and further its impact resistance is deteriorated. Molybdenum content is preferably from 3 to 10%.

In the iron family element, which is one of the components of the bearing layer, iron should occupy at least one third by weight, the balance being at least one of the elements selected from the group consisting of nickel and cobalt. The other components of the bearing layer are dissolved into solid solution of the iron family element, dispersed in the iron family element or form a compound with the iron family element. The reactions, which cause the solutionizing, dispersion and formation of compound, desirably take place during the baking process, which can be realized by using as the starting material the powder consisting of each of the iron family element, phosphorus, boron, molybdenum and lead. However, since pure boron and phosphorus are not readily available, ferroboron (e.g. JIS G2318), boron carbide ($B_4C$) and ferrophosphorus may be used as the starting material.

Even if carbon of the boron carbide remains in the bearing layer, no problem of the properties of the bearing layer result from the carbon in an amount of 3% at the maximum. Molybdenum may also be in the form of ferromolybdenum. The reactions mentioned above taking place during the baking phenomenon contribute to the enhancement of the sliding characteristic as compared to that of the sliding member produced by using the powder of starting material containing all components.

In an embodiment of the present invention the additive component comprises from 3 to 10% of molybdenum and from 15 to 30% of boron and the thickness of the powder coating is not more than 0.3 mm. In this embodiment the iron borides are dispersed in the iron-molybdenum matrix and provide the composite sliding member with good sliding characteristics.

The mating member, i.e. the member to be engaged with the composite sliding member explained above may be an aluminum alloy containing a high silicon content, e.g. from 10 to 28% of silicon. Although, in the case of a mating member made of a high Si aluminum alloy, the hard silicon phases crystallized in the alloy tend to wear the composite sliding member, the composite sliding member of the present invention displays good and stable wear-resistance against the high Si aluminum alloy. The mating member may also be an iron-based alloy. When the mating member is of the same kind as that of the sliding member, heat generation at the sliding surfaces of these members tends to cause adhesion or seizure, generally speaking. However, the problem of adhesion or seizure is avoided by the composite sliding member of the present invention.

The process for producing the composite sliding member according to the present invention comprises:

preparing the powder containing the components of the bearing layer;

mixing the powder with a binder;

applying the mixture of the binder and powder on a base comprising an iron-based alloy to a thickness not more than 0.5 mm, and;

baking the applied mixture and the base, thereby converting the applied mixture to the bearing layer consolidated to the base.

The powder containing the components of the bearing layer is hereinafter referred to as the alloy powder for the sake of brevity. The binder may be any appropriate agent, such as starch paste and aqueous or alcoholic solution of resinous binder, capable of rendering the alloy powder into the state of paste. Most of the binder vaporizes during the baking. The binder may however vent the reduction in the seizure load only by means of making the shoes hard.

Samples Nos. 1 through 4 containing from 3 to 30% of boron in the iron family element, the seizure load is higher than 100 kg/cm². This high seizure load is believed to be attributable to hard borides dispersed in a relatively soft matrix of the iron family element and the high strength base which supports the bearing layer.

Lead contained in Samples 5 and 6 induces no appreciable change in hardness but increases the seizure load as compared with those of the bearing layer comprising the iron family element and boron. The microscopic observation of the surface of the bearing layer of Samples 5 and 6 indicated that lead was dispersed in the bearing layer. The increase of seizure load due to lead is believed to be attributable to the improvement of the break in- and sliding-properties of the bearing layer.

The seizure load of Samples containing phosphorus in addition to lead is almost equivalent to that of Samples containing lead.

EXAMPLE 2

Samples 20 through 32 given in Table 3 were produced and tested in the same procedures as Example 1. The composition of Samples 20 through 32 was the same as that of Samples 1 through 13 indicated in bracket, respectively, except that the former composition contained molybdenum. Seizure load of Samples 20 through 32 was the same as that of Samples 1 through 13, respectively.

TABLE 3

| Sample Nos. | Iron Family Metal (wt %) | | | Additive Element (wt %) | | | |
| --- | --- | --- | --- | --- | --- | --- | --- |
| | Fe | Ni | Co | B | Pb | P | Mo |
| 20 (1) | balance | — | — | 3 | — | — | 1 |
| 21 (2) | " | 20 | — | 15 | — | — | 6 |
| 22 (3) | " | 20 | — | 20 | — | — | 6 |
| 23 (4) | " | 10 | 10 | 30 | — | — | 10 |
| 24 (5) | " | 20 | — | 20 | 1 | — | 6 |
| 25 (6) | " | 20 | — | 20 | 5 | — | 6 |
| 26 (7) | " | 20 | — | 20 | 12 | — | 6 |
| 27 (8) | " | 20 | — | 20 | 5 | 1 | 6 |
| 28 (9) | " | 20 | — | 20 | 5 | 4 | 6 |
| 29 (10) | " | 20 | — | 20 | 5 | 8 | 6 |
| 30 (11) | " | 30 | — | 25 | 3 | 5 | 8 |
| 31 (12) | " | 15 | 20 | 15 | 4 | 5 | 5 |
| 32 (13) | " | 10 | — | 20 | 7 | 3 | 8 |

EXAMPLE 3

The same procedure as Example 1 was repeated except that the mating member consisted of Alusil alloys containing from 19 to 21% of Si, from 5 to 6% of Cu and from 0.45 to 0.65% of Mg, the balance being aluminum and unavoidable impurities. Seizure load is given in Table 4.

TABLE 4

| Sample Nos. | Seizure Load (kg/cm²) |
| --- | --- |
| 1 (Invention) | 100 |
| 2 (Invention) | 160 |
| 3 (Invention) | 160 |
| 4 (Invention) | 160 |
| 5 (Invention) | 140 |
| 6 (Invention) | 160 |
| 7 (Invention) | 180 |
| 8 (Invention) | 160 |
| 9 (Invention) | 160 |
| 10 (Invention) | 180 |
| 11 (Invention) | 160 |

TABLE 4-continued

| Sample Nos. | Seizure Load (kg/cm²) |
| --- | --- |
| 12 (Invention) | 160 |
| 13 (Invention) | 160 |
| 14 (Control) | 60 |
| 15 (Control) | 100 |
| 16 (Control) | 80 |
| 17 (Control) | 60 |
| 18 (Control) | 20 |
| 19 (Control) | 20 |

Figure 1:
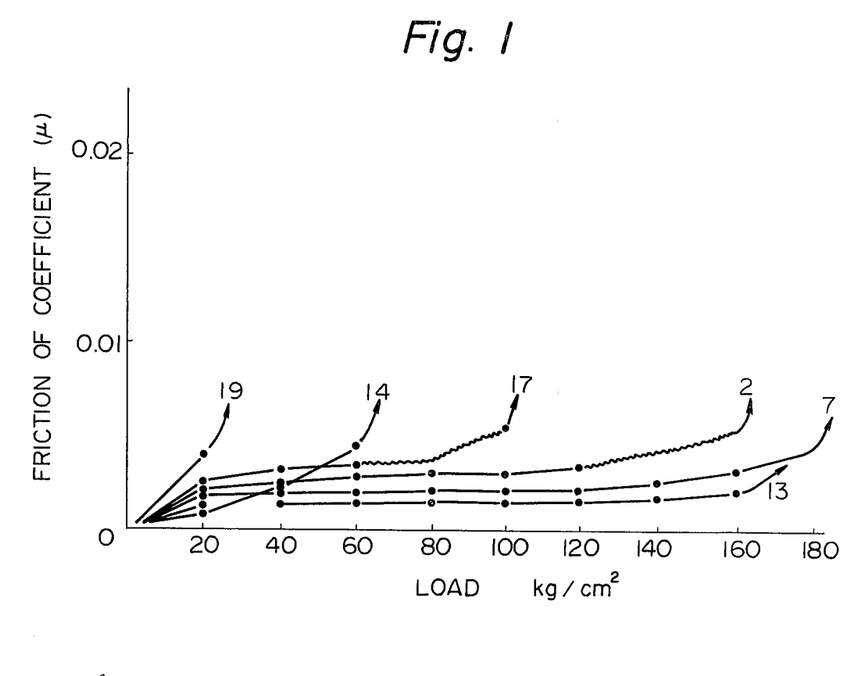
FIG. 1 is a graph indicating the coefficient of friction versus load.

Samples 2, 7, 13, 14, 17 and 19 were subjected to the measurement of coefficient of friction ($\mu$). The measurement result is given in FIG. 1. Although each Sample displays an increase in the coefficient of friction with the increase in load, the load, at which the coefficient of friction drastically increases, and an increasing degree of coefficient of friction are different between Samples. Samples 19(high strength bronze), 14(quenched S45C) and 17(chrome-plated S45C) display a drastic increase of coefficient of friction at low load. Small variations of the coefficient of friction of Sample 17 at a load higher than 60 kg/cm² indicates an instable friction between the material of Sample 17 and the mating member. The increasing rate of coefficient of friction is low and the friction is stable in Samples 2, 7 and 13. Sample 7 containing lead has a low friction of coefficient, and Sample 13 containing both lead and phosphorous has a further lower coefficient of friction.

Figure 2:
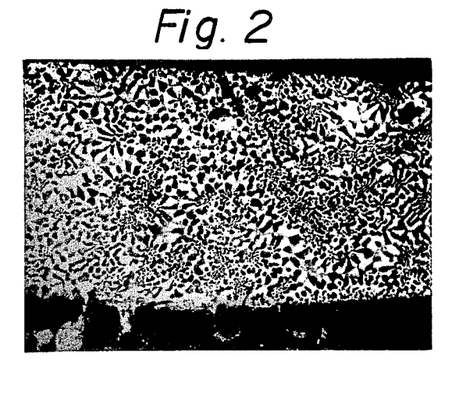
FIGS. 2 and 3 show a microstructure of a composite sliding member of the present invention.

In FIG. 2, the microscopic structure of Sample 9 at the magnification of 100 is illustrated. The lower blackish region and upper whitish region correspond to the base and the bearing layer, respectively. The white and black parts of the bearing layer are borides and matrix consisting of the iron family element, respectively. A homogeneous distribution of borides, which is one of the features of the composite sliding member according to the present invention, is apparent from FIG. 2. Micro-structure of Sample 9 shown in FIG. 3 at the magnification of 1000 indicates that nickel (a number of white spots) was slightly diffused into the base.

EXAMPLE 4

Figure 3:
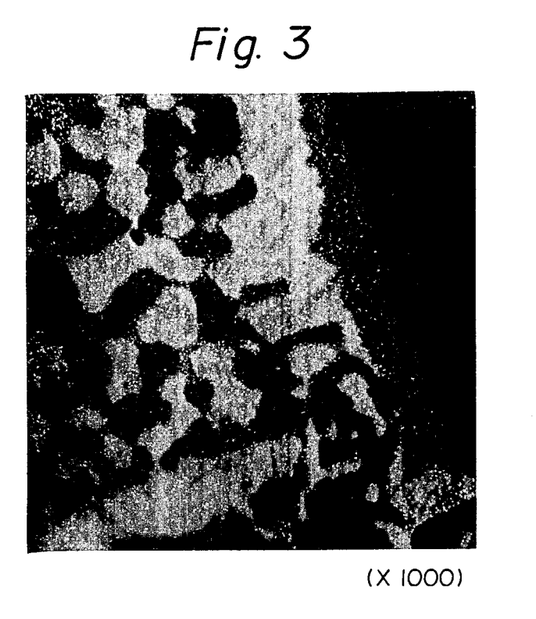

Samples 33 through 48 given in Table 5 were produced in the same procedure as in Example 1 and mounted in the swash plate type compressor shown in FIG. 3.

Figure 4:
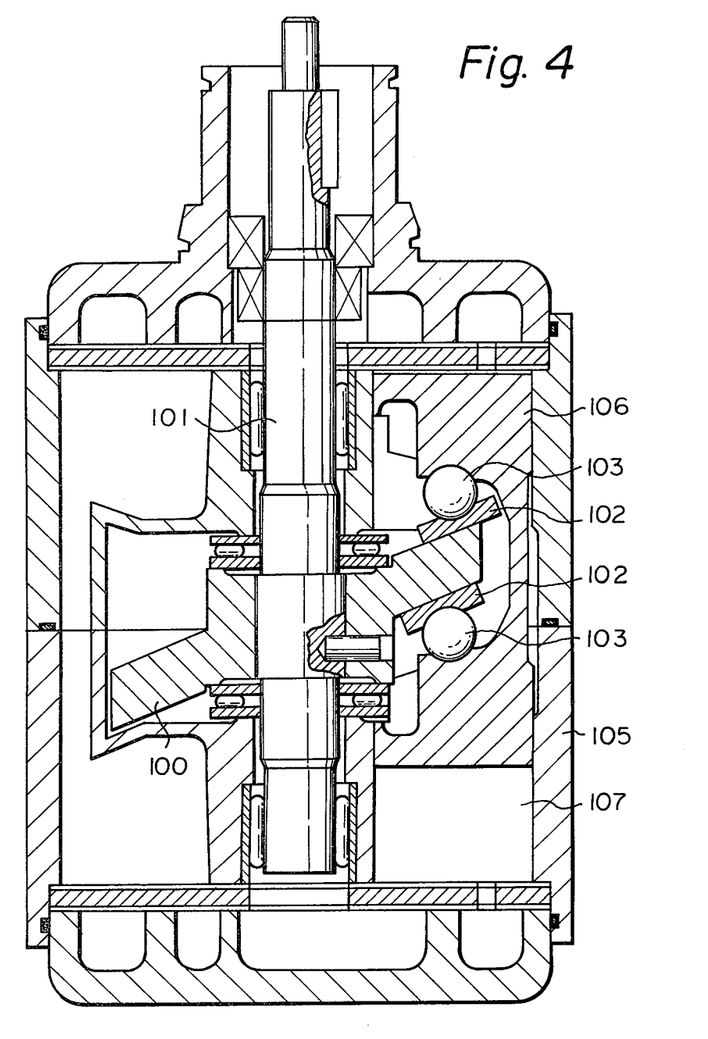
FIG. 4 is a cross-sectional view of a swash plate type compressor.

Referring to FIG. 4, the swash plate 100 is secured to and rotated with a drive shaft 101, the rotating movement of which shaft is converted to a reciprocal movement via shoes 102 slidably engaged with the swash plate 100 and via ball bearings 103 for slidably pressing the shoes against the swash plate. A small amount of lubricating oil between the shoes and the ball bearings of the swash-plate type compressor is supplied to the slidable arrangements in a gaseous state after being mixed with a refrigerant gas. In the bores 107, the reciprocating motion compresses the refrigerant gas which is mixed with oil so as to be circulated in a refrigeration circuit and returned to the compressor, and thereafter transfers the refrigerant gas to the condensor (not shown). The refrigerant gas is cooled in the condensor to be liquefied, and then transferred to the evaporator, thereby the liquefied refrigerant gas is vaporized and latent heat of vaporization is thus removed from the vicinity of the evaporator.

Samples 33 through 48 were mounted in the compressor as shoes and tested in the actual compressor shown in FIG. 4 under the most severe lubricating conditions. Such test conditions are described as follows.

1. Compressor: a swash-plate type compressor with a total displacement of 150 cc/revolution
2. Number of rotations: 4000 rpm
3. Gas pressure at the exhaust side: $Pd=4-5$ kg/cm$^2$
4. Gas pressure at the suction side: Ps=approximately $-50$ mmHg
5. Operation time: 20 hours
6. Lubricating oil: from 90 to 270 cc of an ice machine oil
7. Mating of swash plate: aluminum alloys with Si countent of from 15-25%
8. Amount of refrigerant gas: 100 g (approximately 10% of normal amount)

The results of the test are summarized in the following table.

the seizure tendency using a small amount of lubricating oil.

EXAMPLE 5

Molybdenum-containing samples given in Table 3 were tested under the same conditions as in Example 3 and almost similar seizure loads and coefficients of friction as in Example 3 were obtained.

EXAMPLE 6

In addition to the components of Samples Nos. 33 through 42 (given in parentheses in Table 6) molybdenum was contained in Samples 49 through 58 as shown in Table 6. The amount of lubricating oil, at which the seizure occurred, was approximately the same as in Example 4.

TABLE 5

| Sample Nos. | Swash Plate (wt %) Si (%) | Shoe (wt %) Iron Family Element | B | Pb | P | Lubricating Oil (cc) 270 | 250 | 230 | 210 | 190 | 170 | 150 | 130 | 110 | 90 |
|---|---|---|---|---|---|---|---|---|---|---|---|---|---|---|---|
| 33 | 15 | bal | 3 | — | — | — | — | — | — | ○ | X | X | — | — | — |
| 34 | 15 | " | 15 | — | — | — | — | — | — | — | ○ | X | — | — | — |
| 35 | 15 | " | 30 | — | — | — | — | — | — | — | ○ | X | — | — | — |
| 36 | 15 | " | 15 | 4 | — | — | — | — | — | — | ○ | Δ | X | — | — |
| 37 | 20 | " | 8 | — | — | — | — | — | — | — | ○ | Δ | X | — | — |
| 38 | 20 | " | 15 | 4 | — | — | — | — | — | — | — | ○ | ○ | X | — |
| 39 | 20 | " | 25 | 4 | 5 | — | — | — | — | — | — | — | ○ | X | X |
| 40 | 25 | " | 3 | — | — | — | — | — | — | — | ○ | X | X | — | — |
| 41 | 25 | " | 8 | 2 | — | — | — | — | — | — | — | ○ | ○ | X | — |
| 42 | 25 | " | 20 | 10 | 3 | — | — | — | — | — | — | ○ | ○ | Δ | X |
| 43 | 20 | S45C (Quenched) | | | | — | — | ○ | X | — | — | — | — | — | — |
| 44 | 20 | S45C (Soft-Nitriding Treatment) | | | | — | — | ○ | X | — | — | — | — | — | — |
| 45 | 20 | SKS5 (Quenched and Tempered) | | | | — | — | — | ○ | X | — | — | — | — | — |
| 46 | 20 | S45C (Chrome Plated) | | | | — | — | — | ○ | ○ | X | — | — | — | — |
| 47 | 20 | Phosphor Bronze | | | | X | X | — | — | — | — | — | — | — | — |
| 48 | 20 | High Strength Brass | | | | ○ | X | — | — | — | — | — | — | — | — |

In Table 5, the symbol "○" indicated that no seizure occurred in each of the six samples, the symbol "X" indicates that seizure occurred, and the symbol "Δ" indicates that seizure occurred in a several of the samples.

The results shown in Table 5 illustrate resistance of the shoes against seizure using a low amount of lubricating oil. Samples Nos. 43 through 48 shown the seizure using an amount of lubricating oil in the range of from 170 to 250 cc. Samples Nos. 33 and 40 with boron according to the present invention do not show seizure until the lubricating oil amount is decreased to 170 cc and 130 cc, respectively. The lubricating oil amount, at which seizure occurs, is further reduced in Samples 36, 38 and 41 with lead in addition to boron, which demonstrates that lead enhances break-in property and slidability. For the comparison of Sample Nos. 21 with 28 and Samples Nos. 24 with 26 it turns out that, when the lead and boron contents are identical in the samples, the lubricating oil amount, at which the seizure occurs, is decreased with the increase in the silicon content of the swash plate. This means that a high content of silicon, which is hard, mitigates the seizing tendency of the aluminum alloys of the Samples. From the comparison of Samples 39 and 42 all containing phosphorus, lead and boron with Samples containing lead and boron, it turns out that phosphorus can very effectively suppress

TABLE 6

Shoe (wt %)

| Sample Nos. | Swash Plate Si (%) | Iron Family Element | B | Pb | P | Mo |
|---|---|---|---|---|---|---|
| 49(33) | 15 | bal | 3 | — | — | 1 |
| 50(34) | 15 | " | 15 | — | — | 6 |
| 51(35) | 15 | " | 30 | — | — | 8 |
| 52(36) | 15 | " | 15 | 4 | — | 6 |
| 53(37) | 20 | " | 8 | — | — | 6 |
| 54(38) | 20 | " | 15 | 4 | — | 6 |
| 55(39) | 20 | " | 25 | 4 | 5 | 6 |
| 56(40) | 25 | " | 3 | — | — | 1 |
| 57(41) | 25 | " | 8 | 2 | — | 3 |
| 58(42) | 25 | " | 20 | 10 | 3 | 6 |

EXAMPLE 7

Samples Nos. 59 through 67 given in Table 8 were produced in a manner similar to Example 1 and subjected to testing under the following conditions.

(1) Sliding speed: from 5 m/sec to 3 m/sec
(2) Load: constant load of 100 kg/cm$^2$
(3) Lubricating method: mixture of nine parts by volume of a low viscosity oil SSU 70 and one part by volume of light oil was applied using felt at a rate of 0.1 cc/min.
(4) Surface condition of samples: straightness was 1 micron or less and roughness was from 0.4 to 0.6S.

(5) Disc (mating member) pressed on the samples: the disc had straightness of 1 micron or less and roughness of from 0.4 to 0.6S.
(6) Test time: 10 hours
(7) Environmental temperature: 150° C.

TABLE 7

| Sample Nos. | Iron Family Metal (wt %) | | | Additive Element (wt %) | | | |
|---|---|---|---|---|---|---|---|
| | Fe | Ni | Co | Mo | B | Pb | P |
| 59 | 60 | — | — | 8 | 27 | 5 | — |
| 60 | 50 | 30 | — | 3 | 15 | 2 | — |
| 61 | 50 | 10 | 10 | 5 | 20 | 3 | 1 |
| 62 | 45 | — | 20 | 5 | 24 | 1 | 5 |
| 63 | 41 | 28 | — | 5 | 20 | 3 | 3 |
| 64 | 40 | 30 | — | 5 | 25 | — | — |
| 65 | 40 | 30 | — | 7 | 20 | — | 3 |
| 66 | SUJ2 (Quenched) (Hv 700) | | | | | | |
| 67 | Steel Treated by Manganese Phosphate | | | | | | |

TABLE 8

| Sample Nos. | Sliding Speed | | | | | |
|---|---|---|---|---|---|---|
| | 5 m/sec | 10 m/sec | 15 m/sec | 20 m/sec | 25 m/sec | 30 m/sec |
| 59 (Invention) | O | O | O | O | O | Δ |
| 60 (Invention) | O | O | O | Δ | X | — |
| 61 (Invention) | O | O | O | O | O | Δ |
| 62 (Invention) | O | O | O | O | O | O |
| 63 (Invention) | O | O | O | O | O | O |
| 64 (Invention) | O | O | O | O | X | — |
| 65 (Invention) | O | O | O | O | Δ | X |
| 66 (Control) | O | O | Δ | X | — | — |
| 67 (Control) | O | Δ | X | — | — | — |

The results of the test are given in Table 8, in which the meaning of the symboles "O, Δ and X" is the same as in Table 5. Resistance against seizure in Samples of the present invention especially those containing lead and phosphorous is superior to those of the prior art.

EXAMPLE 8

Samples given in Table 9 were produced and tested using the same procedure as in Example 7, and the results given in Table 11 were obtained. Resistance against seizure in Samples of the present invention, especially those containing lead and phosphorus, is superior to that of the control samples.

TABLE 9

| Sample Nos. | Iron Family Metal (wt %) | | | Additive Element (wt %) | | | |
|---|---|---|---|---|---|---|---|
| | Fe | Ni | Co | Mo | B | Pb | P |
| 68 | bal | — | — | 8 | 27 | 10 | — |
| 69 | " | 30 | — | 3 | 8 | 2 | — |
| 70 | " | 10 | 10 | 5 | 20 | 8 | 1 |
| 71 | " | — | 20 | 5 | 10 | 1 | 8 |
| 72 | " | 28 | — | 5 | 20 | 5 | 5 |
| 73 | " | 30 | — | 5 | 10 | — | — |
| 74 | " | 30 | — | 7 | 20 | — | 8 |
| 75 | SUJ2 (Quenched) (Hv 700) | | | | | | |
| 76 | Steel Treated by Manganese Phosphate | | | | | | |

TABLE 10

| Sample Nos. | Sliding Speed | | | | | |
|---|---|---|---|---|---|---|
| | 5 m/sec | 10 m/sec | 15 m/sec | 20 m/sec | 25 m/sec | 30 m/sec |
| 68 (Invention) | O | O | O | O | O | Δ |
| 69 (Invention) | O | O | O | Δ | X | — |
| 70 (Invention) | O | O | O | O | O | Δ |
| 71 (Invention) | O | O | O | O | O | O |
| 72 (Invention) | O | O | O | O | O | O |
| 73 (Invention) | O | O | O | Δ | X | — |
| 74 (Invention) | | | | | Δ | X |
| 75 (Control) | | | Δ | X | — | — |
| 76 (Control) | | Δ | X | — | — | — |

EXAMPLE 9

Samples 77 through 79 given in Table 11 were produced by using the procedure of Example 1.

TABLE 11

| Sample Nos. | Fe | P (%) | Pb (%) | B (%) |
|---|---|---|---|---|
| 77 | bal | 3 | 0 | 2–30 |
| 78 | " | 3 | 5 | " |
| 79 | " | 3 | 10 | " |

Figure 5:
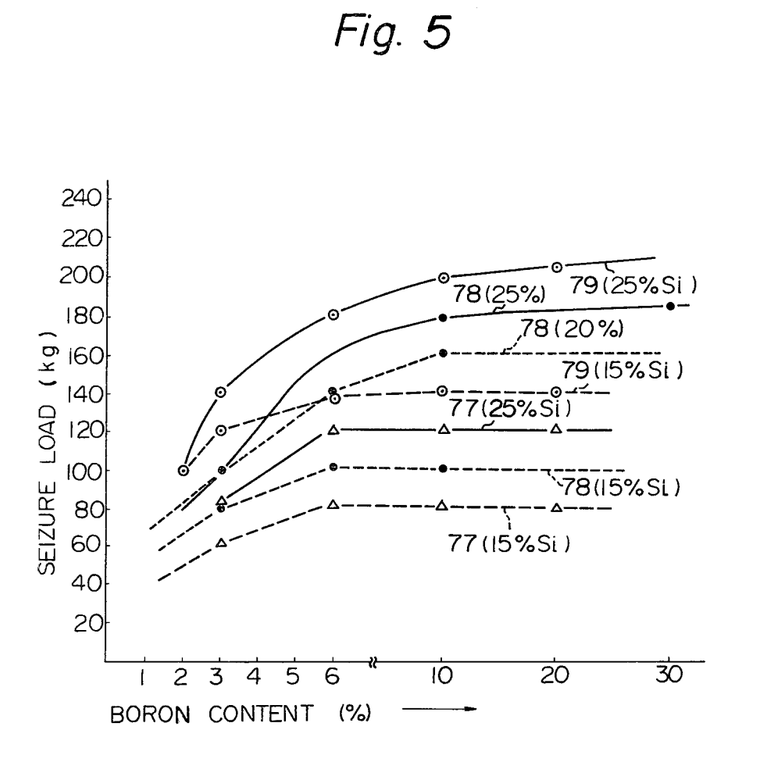
FIG. 5 is a graph indicating the relationship between the seizure load and boron content of the bearing layer.

The seizure load was tested under the same conditions as in Example 3. FIG. 5 illustrates the obtained seizure load related to the boron content. In FIG. 5, the silicon content of the mating members is indicated in parenthese shows in FIG. 5. It will be apparent from FIG. 5 that the seizure load is drastically increased at a boron content of 3% or higher, and; the seizure load stays at an almost constant level at a boron content of about 30%. Seizure load is considerably high at a boron content of from 6 to 30%. The higher silicon content of the mating member provides a higher seizure load. Samples containing phosphorus and boron provide a high seizure load.

We claim:

1. A composite sliding member comprising: a base comprised of an iron-based alloy; and a bearing layer, consolidated with said base and formed by applying on said base a powder coating having a thickness of not more than 0.5 mm and baking said powder coating to consolidate it with said base, said powder comprising an iron family element and from 3% to 30% by weight of boron and from 0.5% to 15% by weight of lead.

2. A composite sliding member according to claim 1, wherein the boron content of said powder is from 15% to 25%.

3. A composite sliding member according to claim 1, wherein the thickness of the powder coating is from 0.1 to 0.5 mm.

4. A composite sliding member according to claim 1, wherein the content of lead in said powder is at least 1%.

5. A composite sliding member according to claim 4, wherein the content of lead in said powder is from 3% to 10%.

6. A composite sliding member according to claim 1, wherein said powder further includes from 0.1% to 10% of molybdenum.

7. A composite sliding member according to claim 6, wherein the content of molybdenum in said powder is from 3% to 10%.

8. A composite sliding member according to claim 1, wherein iron makes up at least one third by weight of said iron family element in said powder.

9. A composite sliding member according to claim 8, wherein the balance of said iron family element in said powder comprises at least one element selected from the group consisting of nickel and cobalt.

10. A composite sliding member comprising:
a base comprising an iron-based alloy; and
a bearing layer, consolidated with said base and formed by applying on said base a powder coating having a thickness of not more than 0.5 mm and baking said powder coating to consolidate it with said base, said powder comprising an iron family element, from 15% to 30% by weight of boron and from 0.5 to 8% by weight of phosphorus.

11. A composite sliding member according to claim 10, wherein the boron content of said powder is from 15% to 25%.

12. A composite sliding member according to claim 10, wherein the thickness of the powder coating is from 0.1 to 0.5 mm.

13. A composite sliding member comprising:
a base comprising an iron-based alloy; and
a bearing layer, consolidated with said base and formed by applying on said base a powder coating having a thickness of not more than 0.5 mm and baking said powder coating to consolidate it with said base, said powder comprising an iron family element, from 3% to 30% by weight of boron, from 0.5 to 8% by weight of phosphorus and lead in an amount up to 15% by weight.

14. A composite sliding member according to claim 13, wherein the content of lead of said powder is at least 0.5%.

15. A composite sliding member according to claim 14, wherein the content of lead of said powder is from 3% to 10%.

* * * * *